Dec. 22, 1953
W. B. WINKLER
2,663,649
ESTER MODIFIED POLYAMIDE RESINS
Filed July 1, 1952
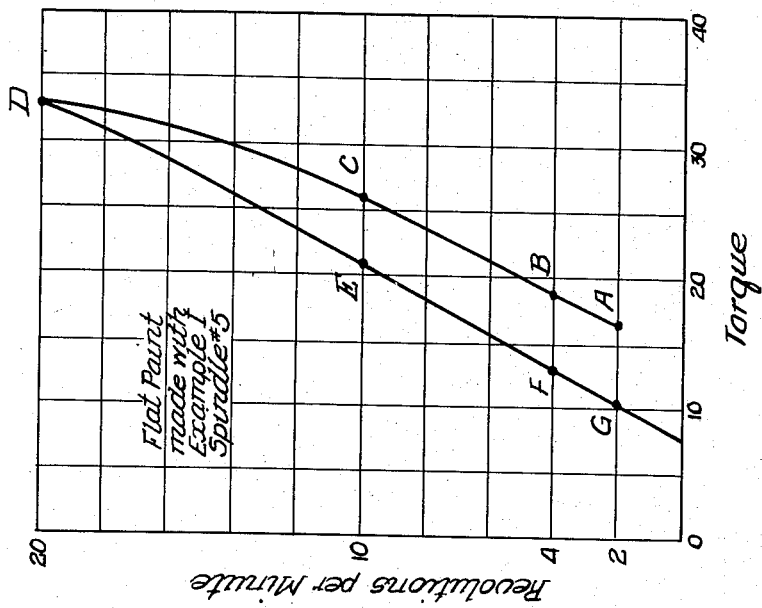
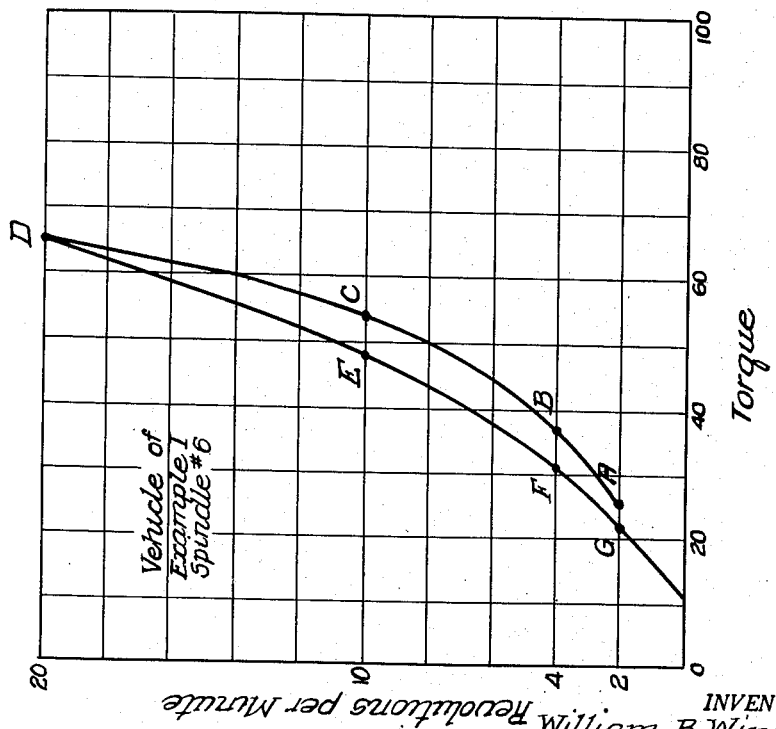
INVENTOR.
William B. Winkler,
BY Wilkinson, Huxley,
Byron + Hume
attys.

Patented Dec. 22, 1953

2,663,649

UNITED STATES PATENT OFFICE 2,663,649

ESTER MODIFIED POLYAMIDE RESINS

William B. Winkler, Chicago, Ill., assignor to T. F. Washburn Co., Chicago, Ill., a corporation of Illinois Application July 1, 1952, Serial No. 296,613

28 Claims. (Cl. 106—287)

This invention relates to vehicles suitable for use in varnishes, inks or paints and more specifically to such vehicles having very pronounced thixotropic properties. This application is a continuation-in-part of applicant's copending application, Serial No. 174,199, filed July 17, 1950, now abandoned.

Many attempts have been made in the past to achieve thixotropy in protective coatings and the like, since such a property will in turn give the finished product desirable characteristics with regard to penetration, brushing, settling and the like. Thixotropic consistency has been known in the field of protective coatings as "puffy body" or "false body" and has been achieved to some degree in the past in paints, for example, by various means. It has been sought in paints since it produces a product which is thick and one that will not settle out undesirably; which is sufficiently stiff so that good quantities can be picked up on the brush but because of the thixotropic character, its stiffness disappears when it is worked under the brush. Other desirable characteristics imparted by thixotropic consistency are good package stability, easy brushing, non-sagging and the elimination of settling and flooding of the pigment.

Agents which have been utilized to produce thixotropy to a limited degree in the past have been called puffing agents, gelling agents, bodying agents, or "trick" liquids. Some of these are bodied oils, strung oils, water, soaps and soap solutions, aluminum octoate, aluminum stearate, limed oils and varnishes and catalytically bodied oils and varnishes. It is known, for example, that settling may be overcome by establishing a rigidity in the paint which will support the net weight of the pigment structure so that the movement of the particle under the influence of gravity is arrested. Heretofore, this type of rigidity has been attained through various means such as finer particle size, high viscosity of the vehicle, gel structure within the system, and flocculation of the pigment. As an example, gel forming substances such as the stearates have been used to improve the suspension and to overcome settling difficulties. It has also long been known that the incorporation of small amounts of water, usually added in the form of soap or a soap solution, serves as a reliable means of promoting good suspension.

Although progress has been made in attaining vehicles having a more or less thixotropic character, all of the methods just discussed leave something to be desired.

It is therefore an object of this invention to provide a truly thixotropic vehicle of the character described, which has a wide range of compatibility with ester bodies suitable for use in coating compositions.

Still another object of this invention is to provide a vehicle of the character described which substantially eliminates sagging in a varnish or paint in which it is incorporated, after it is applied to the surface to be covered; which substantially reduces pigment settling; which contributes to penetration control and ease of brushing; which produces a varnish or paint which has a desirable false body and creamy consistency which, in turn, permits the disposition of relatively large amounts on the brush with which it is being applied, which produces a varnish, ink or paint in which the amount of penetration into fibrous material, such as paper, wallboard or other porous surfaces is decidedly reduced; which eliminates the separation and concentration of the pigment (flooding) both while the paint is being stored and after it has been applied; and finally, which has an unusually wide range of compatibility in mixing.

These objects have been attained by incorporating a polyamide resin into an ester body suitable for use in coating compositions or the like, by a new and novel process, and thinning the resultant product in hydrocarbon solvents. One of the novel aspects of this process is that the polyamide resin which is utilized is actually insoluble in aliphatic solvents and incompatible with vegetable oils and varnishes, but when it has been incorporated in the ester body, in the manner to be subsequently described in detail, the resultant combination of the ester body and the polyamide resin is soluble in mineral spirits.

Polyamide resins of the type which have been found to be useful in the process just described have in one instance been given the trade name "Norelac," which is further identified as the ethylene diamine polymer of polymeric fat acids. Such a resin and a process of preparing the same is described in detail in United States Patent No. 2,450,940, issued to Cowan et al., October 12, 1948. Polyamide resins of this same type are also sold by the General Mills Research Laboratory, Minneapolis, Minnesota, in the following grades: "Hot Melt Compound No. 95; Hot Melt Uncompounded No. 94; and Solvent Type Uncompounded No. 93." These products are identified by the manufacturer as being formed by the reaction of dimerized and trimerized unsaturated fatty acids with a diamine with heat and agitation. They have a molecular weight of between approximately 3000 and 9000 and the "No. 93" type of General Mills, for example, has a softening point (ball and ring) of 105–115° C. These polyamide resins have been found to be insoluble or only very slightly soluble in hydrocarbons, esters, glycols, nitroparaffins and most halogenated hydrocarbons. However, when properly prepared, they are soluble in alcohols, amines, fatty acids, some high aldehydes and ketones, and in a few halogenated hydrocarbons. Secondary solvents include the aliphatic and aromatic hydrocarbons and their halogenated derivatives.

The behavior of these resins in different solvents is unusual enough to have aroused some speculation. According to one authority, organic liquids which contain electron-acceptor groups (such as alcohols, amines and acids) are primary solvents for the resins in question. The same authority states that apparently compounds of this character must contain about three to four carbon atoms and an electron-acceptor group in order to act as solvents for the resins. Chloroform is apparently an exception in regard to the number of carbon atoms but here the chlorine aids in the dissolution. In addition, chloroform has been shown to contain the electron-acceptor group. If the electron-accepting capacity of the molecule is too great, the solubility is apparently reduced. For example, amyl alcohol is a primary solvent for the resins but 1,5-pentanediol is not. The correct balance of electron-accepting power and hydrocarbon solubilizing ability must be maintained, according to one authority, to dissolve or maintain the resins in question in solution.

In addition to all of these previously known characteristics of the polyamide resins which are utilized herein, applicant has made the new and useful determination that they may be used in the preparation of thixotropic vehicles for paints, inks and varnishes, or the like, by incorporating them in an ester body suitable for use in coating compositions, with the application of appropriate heat for a suitable period of time. Although as previously stated, the polyamide resin is normally insoluble in aliphatic solvents, after it has been incorporated in the ester body in this manner, the resultant product is entirely compatible with mineral spirits, for example, and such a combination produces a soft, jelly-like product which does not flow at room temperature but which can readily be used as a vehicle in paints and the like because of its pronounced thixotropic character. This fact is all the more surprising in that even after the product has been so combined with mineral spirits, it does not appear even to one skilled in the art of making protective coatings as a substance that could be useful as a vehicle.

The manner in which this process of incorporation of the resin in the ester body is carried out is quite unconventional in that there is a novel time and temperature relationship which must be followed in order to achieve the result desired. If, for example, the resin and the ester body are merely heated in a conventional way until there is no indication of any resin remaining in an insoluble state, the resultant product will be a clear and soupy liquid having none of the thixotropic characteristics which are so desirable from the standpoint of this invention.

Although the resins in question have been known for some time, and although it has been previously suggested (as in the patent to Bradley No. 2,379,413, issued July 3, 1945) that generally similar resinous materials "are particularly suitable in coating compositions because of their relatively high solubility in the usual coating composition solvents," it is clear that the resins which were discussed in that patent were not those of the present invention, since those of interest here are insoluble in hydrocarbon solvents. In addition, the disclosure in the patent just mentioned indicates that it is desirable to employ both alkyl-olamines and acids having side chains, in order to obtain resins having good solubility and compatibility characteristics. If such soluble forms of the resins were utilized in the process, which is the subject of this present application, the desirable thixotropic properties would not be obtained and it would be impossible to carry out the invention. On the other hand, the resins which are the most useful in the present invention are those prepared from straight chain hydrocarbon diamines and straight chain acids.

This emphasis on the necessity of using soluble types of resins has apparently previously led those skilled in the art in a direction such that the discovery which is the subject matter of this application was completely overlooked. Obviously if solubility were felt to be the most necessary characteristic of the resin to be incorporated in a vehicle for paints and the like, the resins which are the subject matter of this application would never be considered as being suitable for such a use. Obviously, too, if the relatively insoluble resins, which are the subject matter of this application might be thought to be desirable to incorporate in a vehicle for paints, or the like, (which would be very unlikely in view of what has been said of their characteristics) care would be taken to make certain that the resins were completely dissolved in the ester body because of their relative insolubility. This normally would be accomplished by carrying the heat treatment to a point where there would be no indication of any resin remaining in an insoluble state. This, as has been stated, would give as an end product only a clear soupy liquid having no thixotropic character.

Contrary to what might normally be expected, applicant has discovered that if the process of incorporating the resin in the ester body is terminated within a particular range, with respect to the time-temperature relationships, in which range the resin appears not to be completely dissolved, the end product actually turns out to be a thixotropic gel at room temperatures which is completely compatible with mineral spirits and which makes an excellent vehicle for paints and the like.

In the development of this invention to a useful product, it was found necessary to study the several variables which affect reproducibility in production. The time and temperature allowed for reaction of the polyamide resin and the ester body was found to be very critical. At temperatures much lower than 450° F. a relatively long time was required to react the mixture to the desired end point, giving a firm gel in solution without giving particles of unreacted polyamide. A qualitative test for clarity at 10 percent solids in mineral spirits was developed to aid in determining this end point in production.

At 450° F. ten to thirty minutes for reaction was sufficient, longer reaction times increasing the clarity of the solution but producing a soft and thin end product, having no real gel characteristics.

Because of these characteristics of this reaction, it is suggested that an interchange takes place at the amide linkage in the polyamide resin. It may be that a carboxyl group in the alkyd resin polymer takes the place of a carboxyl group of the dimerized fatty acid in the polyamide, thereby shortening the polyamide polymer. The part of the polyamide polymer which has thus become attached to the alkyd resin molecule is also shorter than the original polymer and has become solubilized by attachment to the soluble alkyd. Interchange can also take place between amides and esters.

Prolonged or higher temperature reactions, on the other hand, such as processing at 500 to 550° F. rather than below 500° F. apparently favor further interchange so that the end product is not a thixotropic gel, but a soupy liquid. When the polyamides have been reduced in polymer size and the amide groups widely distributed through the mass by such a further interchange, the amide groups are apparently too far apart to have effective hydrogen bonding forces. Also, when the amide linkages have been widely distributed on the alkyd polymers, containing aromatic structures, steric hindrance may overcome the hydrogen bonding effect.

Regardless of what the actual character of the reaction may be if it is terminated within the critical range, the distribution of amide groups is apparently such that, at room temperatures, and with little or no force acting on the liquid, the hydrogen bonding forces orient the polymers with the resultant desirable effects.

It has also been determined that the interchange reaction mentioned above will proceed more rapidly when the acid number of the alkyd or ester body is high, than when it is low. Apparently the higher the acid number of the ester body, the greater the driving force to make the reaction or interchange take place. Experiments with extremely low acid vegetable oils revealed that it was extremely difficult to get the interchange reaction with the polyamide resins.

From experimentation it has become apparent that a critical degree of reaction of the polyamide resin in the alkyd or other ester body base must be attained. Too low a temperature and/or too short a time of reaction after the addition of the polyamide resin gives poor dispersion, graininess in the 10 percent solids test and low viscosity in any paint or the like formulated from the vehicle so prepared. On the other hand, holding the reaction at too high a temperature and/or for too long a period after the addition of the polyamide resin gives a clear vehicle, indicating that the resin is too well dispersed. Such a vehicle gives resultant products with too low a viscosity.

The end point range for the heat treatment by which the resin is incorporated in the ester body is that combination of time and temperature of processing, after the addition of polyamide resin to the ester body, which gives the maximum viscosity in the finished product. This maximum viscosity obviously is not a single point on a curve but is a range of useful viscosities beyond which, on either side, the viscosity is too low to give a useful product. Selection of the quantity of polyamide to be used in any vehicle is made so that the maximum viscosity range coincides with the useful range of viscosities, in order to use only the minimum quantity of polyamide to produce the desired results.

A satisfactory test has been developed for determining when the batch being cooked has reached the desired end point range. At frequent intervals samples are withdrawn from the batch and a minor portion thereof, such as one part, is dissolved with heat in a major portion, such as nine parts, of mineral spirits. The resultant solution is placed in a test tube of one inch diameter and cooled to room temperature. If the batch is within the desired end point range, this sample solution when cooled has a homogeneous cloudy appearance. Within this end point range, the product has a maximum viscosity, and in the cloud test just described shows maximum turbidity. To determine whether or not the desired end point particularly desired has been reached, the solution is compared with a standard. This standard is obtained by establishing a correlation between the cloudy appearance of the standard test solution with the viscosities of the paints made from the test vehicles.

Generally speaking, a test solution from a batch which has not yet reached the desired end point has a granular appearance indicative of undispersed resin being present. Likewise, a test solution from a batch which has been reacted too long and has passed the desired end point range is perfectly clear. When the batch has reached the desired end point range, the test solution, when cooled, has a cloudy appearance.

Referring now more specifically to the process of combining the polyamide resin and the ester body, it has been found that desirable properties can be obtained in the end product by dispersing approximately 2 to 10 percent of polyamide resin of the type previously described with heat and agitation in a non-volatile base of an alkyd varnish oil or other suitable ester body, the base being selected for desired end use properties. The reaction can normally be carried out below 600° F. and preferably from about 400° F. to 500° F., in, for example, from about 90 to 5 minutes, depending on the nature of the base and the degree of reaction desired. The preferred time decreases substantially linearly from approximately 90 minutes at 430° F. to approximately 5 minutes at 500° F. When the reaction is properly carried out, the resultant vehicles are soluble in aromatic solvents or in petroleum spirits and are readily compatible with most of the common types of oil, alkyd and varnish vehicles used in varnishes, inks or paints.

Suitable resin bases in which to disperse the polyamide resin may take the form of alkyd resins such as the reaction products of polybasic acids, and polyhydric alcohols which may also be modified by incorporation of vegetable oil, fatty acids, rosin or natural or synthetic resins. Natural ester oils, synthetic ester oils, and varnish ester bodies may likewise be utilized. For example, varnishes, ink and paint vehicles made by esterification of oil acids, or oil and resin acids with a polyhydric alcohol are suitable bases. In addition, another satisfactory base has been found to be an oleoresinous varnish or paint vehicle formed by the dispersion of an oil soluble natural or synthetic resin in a drying oil, with heat. Still another suitable base has been found to be natural vegetable oils.

The following examples of the preparation of vehicles which incorporate this invention are given by way of illustration, although the invention is not meant to be necessarily limited thereby:

ALKYD RESINS

Example I

Heat 60 grams soya or linseed oil with 205 grams refined or distilled tall oil, having 50 to 60 percent fatty acids, to 450° F.; add 74 grams pentaerythritol and 0.1 to 0.5 grams of catalyst, lime hydrate, or litharge. Hold temperature at 450–460° F. for alcoholysis, determined by a conventional test, such as clarity of solution containing 1 part of base and 4 parts of methyl alcohol; add 76 grams phthalic anhydride and 9 grams of maleic anhydride. Heat to 500° F. and hold for acid number 10 or less, on base, and viscosity W–Z (Gardner-Holdt) at 50 percent solids in mineral spirits. Temperature is preferably lowered near the end of this part of cook. Then add 20 grams polyamide resin and hold at 430–450° F. until 1 part base to 9 parts mineral spirits shows no graininess and has maximum turbidity. Thin in mineral spirits to desired percent non-volatile. This entire process is best carried out in a covered vessel equipped with agitator and inert gas dispenser.

The resulting product is suitable as a sole vehicle for flat, eggshell and semigloss paints, and as a modifying agent in enamel, semigloss, eggshell and flat paints. The vehicle modified may be alkyd or oleoresinous, and usually mineral spirits soluble. This product is compatible with a wide selection of vehicles encountered in paint manufacturing.

Example II

Heat 1125 grams refined soya or linseed oil to 500° F. Add 310 grams pentaerythritol and 0.5 gram lime or litharge catalyst. Hold at 460–470° F. for alcoholysis, determined by a conventional test such as clarity of solution containing one part of base and four parts of methyl alcohol; add 540 grams phthalic anhydride and heat to 480° F. Hold for acid number 10 or less, on base, and viscosity Z (Gardner-Holdt) at 70 percent solids in mineral spirits. Add 36 grams polyamide resin, hold at 430–450° F. until cloud test, one part base to nine parts mineral spirits, shows no graininess and has maximum turbidity. Reduce in mineral spirits. Use agitation and inert gas throughout process.

Example III

Heat 320 grams refined soybean oil with 90 grams of glycerine and 0.25 gram of sodium hydroxide as catalyst together under agitation and $CO_2$ blanket to 460° F. Hold for alcoholysis, determined as in Example I. Add 247 grams phthalic anhydride. Heat to 465° F. and add 30 grams of glycerine. Reheat to 480° F. and hold for viscosity W to X and acid number below 10. Add 30 grams of polyamide resin and hold at 430–450° F. until cloud test shows no graininess and has maximum turbidity. Reduce in mineral spirits.

NATURAL ESTER OILS

Example IV

Heat 1000 grams refined soya or linseed oil to 500° F. Add 60 grams polyamide resin. Hold at 480–500° F. until cloud test shows maximum turbidity.

SYNTHETIC ESTER OILS

Example V

Heat 840 grams linseed fatty acids to 450° F. Add 101 grams pentaerythritol and hold at 450° F. with agitation until acid number is approximately 10. Add 45 grams polyamide resin and hold at 430–450° F. until cloud test shows maximum turbidity.

Example VI

Heat 840 grams dehydrated castor oil acids to 450° F. Add 50 grams pentaerythritol and 42 grams of glycerine and hold at 450° F. with agitation until acid number is approximately 10. Add 45 grams of polyamide resin and hold at 430–450° F. until cloud test shows maximum turbidity.

VARNISH ESTER BODIES

Example VII

Charge 160 grams ester gum and 360 grams Z-body (Gardner-Holdt) dehydrated castor oil. Heat to 600° F. Hold for string. Cool to 500° F., add 25 grams polyamide resin, let cool to 400° F. and hold until maximum turbidity in cloud test is reached. Thin with mineral spirits to desired percent solids.

Example VIII

Heat 1000 grams refined or distilled tall oil having 50 to 60 percent fatty acids to 410° F. Add 173 grams tripentaerythritol. Heat to 560° F. Hold for acid number 10. Drop temperature to 500° F. Add 30 grams polyamide resin. Let temperature drop to 400° F. Hold until maximum turbidity is reached in cloud test and thin in mineral spirits as desired. Use agitation throughout process.

This product may be useful in paints or inks or clear coatings as the sole vehicle or as a modifier.

Example IX

Heat 918 grams refined or distilled tall oil to 300° F. Add 26 grams maleic anhydride. Hold 30 minutes at 300° F. Heat to 420° F., add 121 grams pentaerythritol. Hold until clear, then heat to 585–600° F. Hold for acid number below 10, drop temperature to 500° F. Add 50 grams polyamide resin. Let cool and hold above 400° F. until maximum turbidity is reached in cloud test.

This product may be useful in paints or inks or clear coatings as the sole vehicle or as a modifier.

Example X

Heat 100 grams of a modified phenol-aldehyde resin for example rosin-modified phenol-aldehyde such as Amberol M–93 and 156 grams of tung oil to 560° F. Hold for desired viscosity, add 18 grams polyamide resin, and hold at 500° F. for end point in cloud test. Reduce in mineral spirits. This product may be useful as a varnish or vehicle for paints.

Example XI

Heat 150 grams of a modified phenolic resin such as Amberol F–7 and 300 grams of refined linseed oil to 500° F. Add 27 grams of polyamide resin and hold for end point in cloud test. This product may be useful in inks.

The term ester bodies is meant herein to include bodies resulting from esterification and ester interchange reactions involving as reactants polyhydric alcohols, fatty acids and their esters, polybasic acids and anhydrides, natural resins and their acids, and the numerous commercial synthetic resins.

The oil soluble resins may be replaced wholly or in part by natural resins, rosin, ester gum, limed rosin, phenolic resins, rosin modified phenolics, maleic modified ester gums, coumaroneindene resins, and petroleum resins.

Phthalic anhydride may be replaced wholly or in part by maleic anhydride, fumaric acid, sebacic acid, adipic acid, or succinic anhydride. Pentaerythritol may be replaced in part or wholly by glycerol, and in part by ethylene or propylene glycol, or other polyhydric alcohols.

The oils or fatty acids mentioned in the above examples may be replaced wholly or in part by perilla, fish, rapeseed, hempseed, China wood, oiticica, cocoanut, safflower, castor, dehydrated castor and sunflower oils or the fatty acids thereof.

A graphical representation of the thixotropic characteristics of the vehicles which are the subject of this invention is shown in Figure 1 in the drawing which illustrate the thixotropic characteristics of the vehicle described in Example I above. A similar representation for a flat paint made with a vehicle of Example I above is shown in Figure 2.

A Brookfield viscosimeter, type MVF, was used in obtaining the plotted data, a No. 6 spindle being used for Figure 1 and a No. 5 spindle being used for Figure 2. The temperature of the product, the characteristics of which were being plotted, was adjusted to 78° F., readings being taken at each speed of rotation of the spindle until the difference between individual readings was one unit or less on the 100 scale. The last torque reading taken in this fashion for each speed has been plotted against the revolutions per minute in both Figures 1 and 2.

Starting with the material at rest the readings were taken successively in the following order of spindle rotations; 2, 4, 10, 20, 10, 4 and 2 revolutions per minute. The torque reading for these speeds in each case is represented by the points A, B, C, D, E, F and G, respectively, in both Figures 1 and 2. The approximate rotation time at each speed until the difference between the readings became one unit or less as mentioned above were as follows:

| | Seconds |
|---|---|
| 2 R. P. M. | 60 |
| 4 R. P. M. | 30 |
| 10 R. P. M. | 20 |
| 20 R. P. M. | 10 |

The vehicle described in Example I was thinned in mineral spirits to 40 percent solids. The flat paint made with this vehicle followed a conventional formula.

The two curves obtained are good examples of hysteresis curves which are characteristic of thixotropic substances. The amount of torque necessary to turn the spindle at a given speed obviously is reduced by the intervening greater agitation produced at a greater speed.

It is claimed:

1. The process of preparing a thixotropic vehicle for protective coatings which comprises heating a polyamide resin having a molecular weight between approximately 3000 and 9000 which is formed by the reaction of dimerized and trimerized unsaturated fat acids with an alkylene polyamine with two to four amine substituents, and a vehicle selected from the group consisting of glyceride oils, oil-modified alkyd resins and varnish ester bodies at a temperature and for a time ranging between 430° F. for approximately 90 minutes and 500° F. for approximately 5 minutes, respectively, until a one part sample mixed with nine parts of mineral spirits when cooled to room temperature shows no graininess, and has maximum turbidity and a cloudy appearance.

2. The process of preparing a thixotropic vehicle for protective coatings which comprises heating a polyamide resin having a molecular weight between approximately 3000 and 9000 which is formed by the reaction of dimerized and trimerized unsaturated fat acids with an alkylene polyamine with two to four amine substituents, and a vehicle selected from the group consisting of glyceride oils, oil-modified alkyd resins and varnish ester bodies at a temperature of between approximately 430° F. to 500° F. for a time decreasing substantially linearly from approximately 90 minutes at 430° F. to approximately 5 minutes at 500° F., until a one part sample mixed with nine parts of mineral spirits when cooled to room temperature shows no graininess, and has maximum turbidity and a cloudy appearance.

3. The process of preparing a thixotropic vehicle for protective coatings which comprises heating a polyamide resin having a molecular weight between approximately 3000 and 9000 which is formed by the reaction of dimerized and trimerized unsaturated fat acids with an alkylene polyamine with two to four amine substituents, and a vehicle selected from the group consisting of glyceride oils, oil-modified alkyd resins and varnish ester bodies at a temperature above the melting point of said polyamide resin but below 600° F. until a one part sample mixed with nine parts of mineral spirits when cooled to room temperature shows no graininess, and has maximum turbidity and a cloudy appearance.

4. The process of preparing a thixotropic vehicle for protective coatings which comprises heating a polyamide resin having a molecular weight between approximately 3000 and 9000 which is formed by the reaction of dimerized and trimerized unsaturated fat acids with an alkylene diamine, and a vehicle selected from the group consisting of glyceride oils, oil-modified alkyd resins and varnish ester bodies at a temperature above the melting point of said polyamide resin but below 600° F. until a one part sample mixed with nine parts of mineral spirits when cooled to room temperature shows no graininess, and has maximum turbidity and a cloudy appearance.

5. The process of preparing a thixotropic vehicle for protective coatings which comprises heating a polyamide resin having a molecular weight between approximately 3000 and 9000 which is formed by the reaction of dimerized and trimerized unsaturated fat acids with ethylene diamine, and a vehicle selected from the group consisting of glyceride oils, oil-modified alkyd resins and varnish ester bodies at a temperature above the melting point of said polyamide resin but below 600° F. until a one part sample mixed with nine parts of mineral spirits when cooled to room temperature shows no graininess, and has maximum turbidity and a cloudy appearance.

6. The process of preparing a thixotropic vehicle for protective coatings which comprises heating a polyamide resin having a molecular weight between approximately 3000 and 9000 which is formed by the reaction of polymeric polyene fat acids with an alkylene polyamine with two to four amine substituents, and a vehicle selected from the group consisting of glyceride oils, oil-modified alkyd resins and varnish ester bodies at a temperature above the melting point of said polyamide resin but below 600° F. until a one part sample mixed with nine parts of mineral spirits when cooled to room temperature shows no graininess, and has maximum turbidity and a cloudy appearance.

7. The process of preparing a thixotropic vehicle for protective coatings which comprises heating a polyamide resin having a molecular weight between approximately 3000 and 9000 which is formed by the reaction of polymeric polyene fat acids with an alkylene polyamine with two to four amine substituents, and a vehicle selected from the group consisting of glyceride oils, oil-modified alkyd resins and varnish ester bodies at a temperature and for a time ranging between 430° F. for approximately 90 minutes and 500° F. for approximately 5 minutes, respectively, until a one part sample mixed with nine parts of mineral spirits when cooled to room temperature shows no graininess, and has maximum turbidity and a cloudy appearance.

8. The process of preparing a thixotropic vehicle for protective coatings which comprises heating a polyamide resin having a molecular weight between approximately 3000 and 9000 which is formed by the reaction of polymeric polyene fat acids with an alkylene diamine, and a vehicle selected from the group consisting of glyceride oils, oil-modified alkyd resins and varnish ester bodies at a temperature of between approximately 430° F. to 500° F. for a time decreasing substantially linearly from approximately 90 minutes at 430° F. to approximately 5 minutes at 500° F., until a one part sample mixed with nine parts of mineral spirits when cooled to room temperature shows no graininess, and has maximum turbidity and a cloudy appearance.

9. The process of preparing a thixotropic vehicle for protective coatings which comprises heating a polyamide resin having a molecular weight between approximately 3000 and 9000 which is formed by the reaction of dimerized and trimerized unsaturated fat acids with an alkylene polyamine with two to four amine substituents, and an ester body which is the reaction product of a polyhydric alcohol having three to four alcoholic hydroxyls and a fat acid at a temperature and for a time ranging between 430° F. for approximately 90 minutes and 500° F. for approximately 5 minutes, respectively, until a one part sample mixed with nine parts of mineral spirits when cooled to room temperature shows no graininess, and has maximum turbidity and a cloudy appearance.

10. The process of preparing a thixotropic vehicle for protective coatings which comprises heating a polyamide resin having a molecular weight between approximately 3000 and 9000 which is formed by the reaction of dimerized and trimerized unsaturated fat acids with an alkylene polyamine with two to four amine substituents, and an ester body which is the reaction product of a polyhydric alcohol having three to four alcoholic hydroxyls and a fat acid at a temperature above the melting point of said polyamide resin but below 600° F. until a one part sample mixed with nine parts of mineral spirits when cooled to room temperature shows no graininess, and has maximum turbidity and a cloudy appearance.

11. The process of preparing a thixotropic vehicle for protective coatings which comprises heating a polyamide resin having a molecular weight between approximately 3000 and 9000 which is formed by the reaction of polymeric polyene fat acids with an alkylene polyamine with two to four amine substituents, and an ester body which is the reaction product of a polyhydric alcohol having three to four alcoholic hydroxyls and a fat acid at a temperature above the melting point of said polyamide resin but below 600° F. until a one part sample mixed with nine parts of mineral spirits when cooled to room temperature shows no graininess, and has maximum turbidity and a cloudy appearance.

12. The process of preparing a thixotropic vehicle for protective coatings which comprises heating a polyamide resin having a molecular weight between approximately 3000 and 9000 which is formed by the reaction of polymeric polyene fat acids with an alkylene polyamine with two to four amine substituents, and an ester body which is the reaction product of a polyhydric alcohol having three to four alcoholic hydroxyls and a fat acid at a temperature and for a time ranging between 430° F. for approximately 90 minutes and 500° F. for approximately 5 minutes, respectively, until a one part sample mixed with nine parts of mineral spirits when cooled to room temperature shows no graininess, and has maximum turbidity and a cloudy appearance.

13. The process of preparing a thixotropic vehicle for protective coatings which comprises heating a polyamide resin having a molecular weight between approximately 3000 and 9000 which is formed by the reaction of dimerized and trimerized unsaturated fat acids with an alkylene polyamine with two to four amine substituents, and an ester body which is the reaction product of a polyhydric alcohol having three to four alcoholic hydroxyls, a fat acid and an unsaturated dibasic acid at a temperature and for a time ranging between 430° F. for approximately 90 minutes and 500° F. for approximately 5 minutes, respectively, until a one part sample mixed with nine parts of mineral spirits when cooled to room temperature shows no graininess, and has maximum turbidity and a cloudy appearance.

14. The process of preparing a thixotropic vehicle for protective coatings which comprises heating a polyamide resin having a molecular weight between approximately 3000 and 9000 which is formed by the reaction of polymeric polyene fat acids with an alkylene polyamine with two to four amine substituents, and an ester body which is the reaction product of a polyhydric alcohol having three to four alcoholic hydroxyls, a fat acid and an unsaturated dibasic acid at a temperature and for a time ranging between 430° F. for approximately 90 minutes and 500° F. for approximately 5 minutes, respectively, until a one part sample mixed with nine parts of mineral spirits when cooled to room temperature shows no graininess, and has maximum turbidity and a cloudy appearance.

15. The process of preparing a thixotropic vehicle for protective coatings which comprises heating a polyamide resin having a molecular weight between approximately 3000 and 9000 which is formed by the reaction of dimerized and trimerized unsaturated fat acids with an alkylene polyamine with two to four amine substituents, and an ester body which is the reaction product of a polyhydric alcohol having three to four alcoholic hydroxyls, a fat acid and an oil soluble phenolic resin at a temperature and for a time ranging between 430° F. for approximately 90 minutes and 500° F. for approximately 5 minutes, respectively, until a one part sample mixed with nine parts of mineral spirits when cooled to room temperature shows no graininess, and has maximum turbidity and a cloudy appearance.

16. The process of preparing a thixotropic vehicle for protective coatings which comprises heating a polyamide resin having a molecular weight between approximately 3000 and 9000 which is formed by the reaction of dimerized and trimerized unsaturated fat acids with an alkylene polyamine with two to four amine substituents, and an ester body which is the reaction product of a polyhydric alcohol having three to four alcoholic hydroxyls, a fat acid and an unsaturated dibasic acid at a temperature above the melting point of said polyamide resin but below 600° F. until a one part sample mixed with nine parts of mineral spirits when cooled to room temperature shows no graininess, and has maximum turbidity and a cloudy appearance.

17. The process of preparing a thixotropic vehicle for protective coatings which comprises heating a polyamide resin having a molecular weight between approximately 3000 and 9000 which is formed by the reaction of polymeric polyene fat acids with an alkylene polyamine with two to four amine substituents, and an ester body which is the reaction product of a polyhydric alcohol having three to four alcoholic hydroxyls, a fat acid and an unsaturated dibasic acid at a temperature above the melting point of said polyamide resin but below 600° F. until a one part sample mixed with nine parts of mineral spirits when cooled to room temperature shows no graininess, and has maximum turbidity and a cloudy appearance.

18. The process of preparing a thixotropic vehicle for protective coatings which comprises heating a polyamide resin having a molecular weight between approximately 3000 and 9000 which is formed by the reaction of dimerized and trimerized unsaturated fat acids with an alkylene polyamine with two to four amine substituents, and an ester body which is the reaction product of a polyhydric alcohol having three to four alcoholic hydroxyls, a fat acid and an oil soluble phenolic resin at a temperature above the melting point of said polyamide resin but below 600° F. until a one part sample mixed with nine parts of mineral spirits when cooled to room temperature shows no graininess, and has maixmum turbidity and a cloudy appearance.

19. A thixotropic vehicle for protective coatings comprising a product obtained by heating a polyamide resin having a molecular weight between approximately 3000 and 9000 which is formed by the reaction of dimerized and trimerized unsaturated fat acids with an alkylene polyamine with two to four amine substituents, and a vehicle selected from the group consisting of glyceride oils, oil-modified alkyd resins and varnish ester bodies at a temperature above the melting point of said polyamide resin but below 600° F. until a one part sample mixed with nine parts of mineral spirits when cooled to room temperature shows no graininess, and has maximum turbidity and a cloudy appearance.

20. A thixotropic vehicle for protective coatings comprising a product obtained by heating a polyamide resin having a molecular weight between approximately 3000 to 9000 which is formed by the reaction of dimerized and trimerized unsaturated fat acids with an alkylene diamine, and a vehicle selected from the group consisting of glyceride oils, oil-modified alkyd resins and varnish ester bodies at a temperature above the melting point of said polyamide resin but below 600° F. until a one part sample mixed with nine parts of mineral spirits when cooled to room temperature shows no graininess, and has maximum turbidity and a cloudy appearance.

21. A thixotropic vehicle for protective coatings comprising a product obtained by heating a polyamide resin having a molecular weight between approximately 3000 and 9000 which is formed by the reaction of dimerized and trimerized unsaturated fat acids with ethylene diamine, and a vehicle selected from the group consisting of glyceride oils, oil-modified alkyd resins and varnish ester bodies at a temperature above the melting point of said polyamide resin but below 600° F. until a one part sample mixed with nine parts of mineral spirits when cooled to room temperature shows no graininess, and has maximum turbidity and a cloudy appearance.

22. A thixotropic vehicle for protective coatings comprising a product obtained by heating a polyamide resin having a molecular weight between approximately 3000 and 9000 which is formed by the reaction of polymeric polyene fat acids with an alkylene polyamine with two to four amine substituents, and a vehicle selected from the group consisting of glyceride oils, oil-modified alkyd resins and varnish ester bodies at a temperature above the melting point of said polyamide resin but below 600° F. until a one part sample mixed with nine parts of mineral spirits when cooled to room temperature shows no graininess, and has maximum turbidity and a cloudy appearance.

23. A thixotropic vehicle for protective coatings comprising a product obtained by heating a polyamide resin having a molecular weight between approximately 3000 and 9000 which is formed by the reaction of polymeric polyene fat acids with an alkylene diamine, and a vehicle selected from the group consisting of glyceride oils, oil-modified alkyd resins and varnish ester bodies at a temperature above the melting point of said polyamide resin but below 600° F., until a one part sample mixed with nine parts of mineral spirits when cooled to room temperature shows no graininess, and has maximum turbidity and a cloudy appearance.

24. A thixotropic vehicle for protective coatings comprising a product obtained by heating a polyamide resin having a molecular weight between approximately 3000 and 9000 which is formed by the reaction of dimerized and trimerized unsaturated fat acids with an alkylene polyamine with two to four amine substituents, and an ester body which is the reaction product of a polyhydric alcohol having three to four alcoholic hydroxyls and a fat acid at a temperature above the melting point of said polyamide resin but below 600° F. until a one part sample mixed with nine parts of mineral spirits when cooled to room temperature shows no graininess, and has maximum turbidity and a cloudy appearance.

25. A thixotropic vehicle for protective coatings comprising a product obtained by heating a polyamide resin having a molecular weight between approximately 3000 and 9000 which is formed by the reaction of polymeric polyene fat acids with an alkylene polyamine with two to four amine substituents, and an ester body which is the reaction product of a polyhydric alcohol having three to four alcoholic hydroxyls and a fat acid at a temperature above the melting point of said polyamide resin but below 600° F. until a one part sample mixed with nine parts of mineral spirits when cooled to room temperature shows no graininess, and has maximum turbidity and a cloudy appearance.

26. A thixotropic vehicle for protective coatings comprising a product obtained by heating a polyamide resin having a molecular weight between approximately 3000 and 9000 which is formed by the reaction of dimerized and trimerized unsaturated fat acids with an alkylene polyamine with two to four amine substituents, and an ester body which is the reaction product of a polyhydric alcohol having three to four alcoholic hydroxyls, a fat acid and an unsaturated dibasic acid at a temperature above the melting point of said polyamide resin but below 600° F. until a one part sample mixed with nine parts of mineral spirits when cooled to room temperature shows no graininess, and has maximum turbidity and a cloudy appearance.

27. A thixotropic vehicle for protective coatings comprising a product obtained by heating a polyamide resin having a molecular weight between approximately 3000 and 9000 which is formed by the reaction of polymeric polyene fat acids with an alkylene polyamine with two to four amine substituents, and an ester body which is the reaction product of a polyhydric alcohol having three to four alcoholic hydroxyls, a fat acid and an unsaturated dibasic acid at a temperature above the melting point of said polyamide resin but below 600° F. until a one part sample mixed with nine parts of mineral spirits when cooled to room temperature shows no graininess, and has maximum turbidity and a cloudy appearance.

28. A thixotropic vehicle for protective coatings comprising a product obtained by heating a polyamide resin having a molecular weight between approximately 3000 and 9000 which is formed by the reaction of dimerized and trimerized unsaturated fat acids with an alkylene polyamine with two to four amine substituents, and an ester body which is the reaction product of a polyhydric alcohol having three to four alcoholic hydroxyls, a fat acid and an oil soluble phenolic resin at a temperature above the melting point of said polyamide resin but below 600° F. until a one part sample mixed with nine parts of mineral spirits when cooled to room temperature shows no graininess, and has maximum turbidity and a cloudy appearance.

WILLIAM B. WINKLER.

References Cited in the file of this patent

UNITED STATES PATENTS

| Number | Name | Date |
|---|---|---|
| 2,379,413 | Bradley | July 3, 1945 |
| 2,450,940 | Cowan et al. | Oct. 12, 1948 |

OTHER REFERENCES

Oil and Soap, vol. 21, pp. 101–107, April 1944.